Jan. 13, 1925.
O. CHAMBERLAIN ET AL
1,523,052
TRACTOR ATTACHMENT
Filed Nov. 5, 1921     3 Sheets-Sheet 1
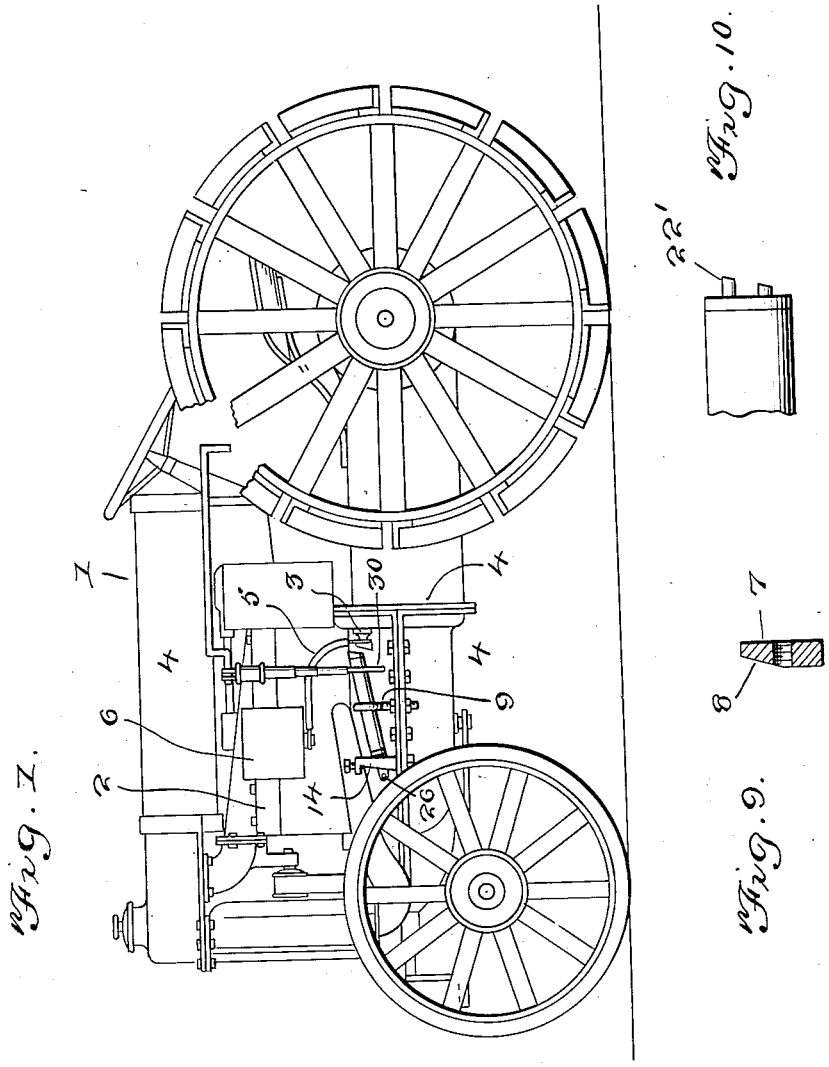
O. Chamberlain
E. D. Hayden
INVENTORS
BY Victor J. Evans
ATTORNEY
E. R. Ruppert
WITNESS:

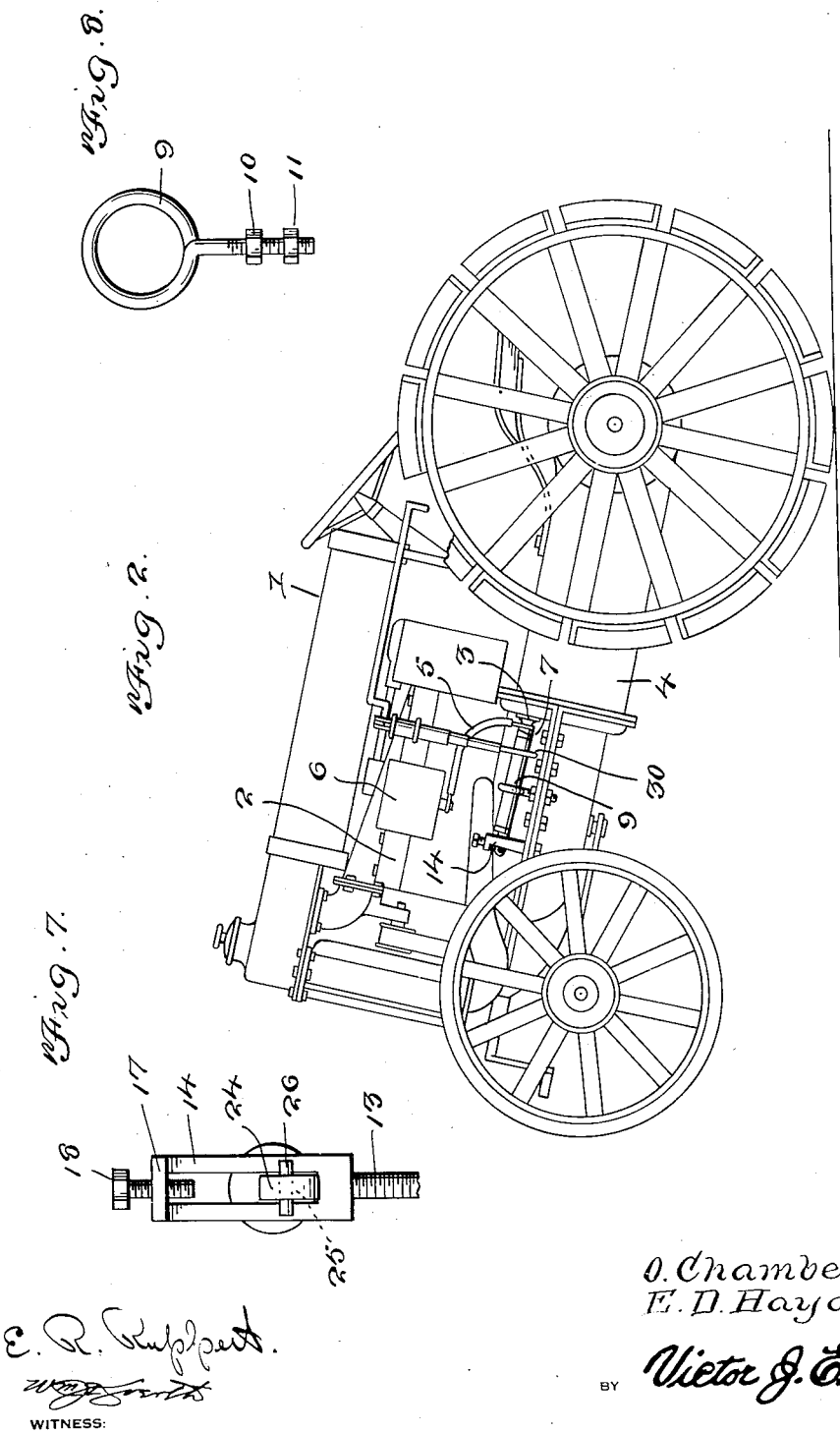

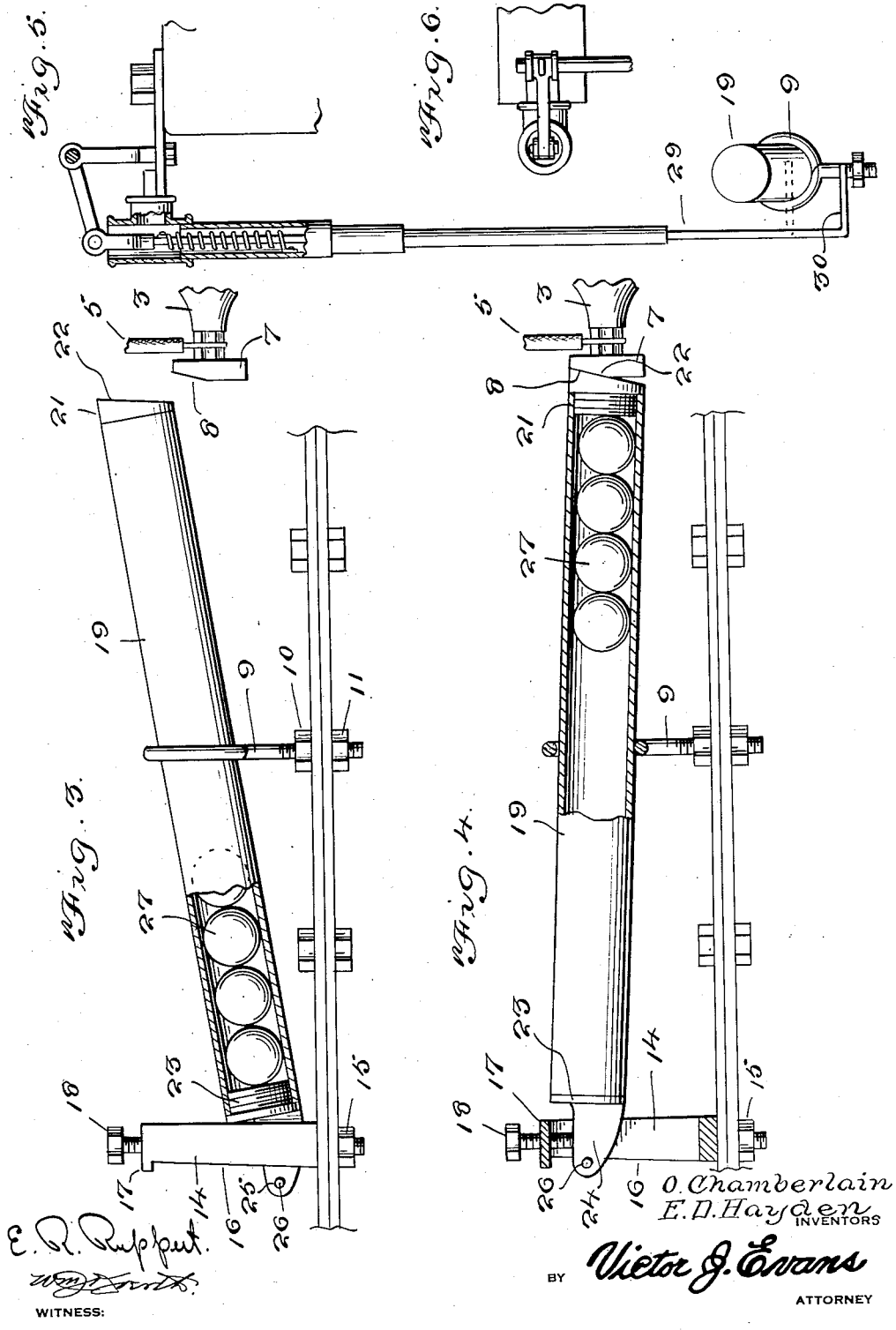

Patented Jan. 13, 1925.

1,523,052

UNITED STATES PATENT OFFICE.

OTIS CHAMBERLAIN AND ELLSWORTH D. HAYDEN, OF PENDLETON, OREGON.

TRACTOR ATTACHMENT.

Application filed November 5, 1921. Serial No. 513,090.

*To all whom it may concern:*

Be it known that we, OTIS CHAMBERLAIN and ELLSWORTH D. HAYDEN, citizens of the United States, residing at Pendleton, in the county of Umatilla and State of Oregon, have invented new and useful Improvements in Tractor Attachments, of which the following is a specification.

Tractors driven by internal combustion engines have a tendency, under certain conditions, to rear or move upwardly and turn over backwardly with disastrous results to both the machine and the operator thereof.

It is the object of the present invention to provide in a tractor driven by an internal combustion motor, means operable by rearing or undue upward movement of the forward portion of the tractor to automatically break the ignition of the motor and thereby effectively stop said rearing and eliminate danger to operators attendant thereon.

It is a further object of the invention to produce an ignition breaking means of such character that the same may be readily attached to any ordinary construction of motor driven tractors and which is also of such construction as to withstand the rough usage to which such tractors are ordinarily subjected, and in which such means will automatically return to initial non-short circuiting position when the tractor has righted itself.

It is a further object of the invention to produce an ignition breaking means in the nature of a member grounded on the frame of the engine and mounted thereon in such manner as to permit both a swinging and rectilinear movement thereof in the direction of the binding post between the magneto and coils of the motor, or other means for supplying the ignition means of the engine with current, whereby both a direct and wiping contact will be effected, while means, under the control of the operator is provided for preventing the circuit breaking means breaking the circuit, as when the tractor is traveling over desirable elevations.

I obtain the foregoing objects and others which will appear as the nature of the invention is better understood, by a construction, combination and operative association of parts such as is disclosed by the drawings which accompany and form part of this specification.

In the drawings:—

Figure 1 is a side elevation of a portion of a motor driven tractor illustrating the application of the improvement.

Figure 2 is a substantially similar view but showing the arrangement of parts when the forward portion of the tractor has reared or moved upwardly.

Figure 3 is a side view of the cylinder which forms part of this invention, in normal position and showing the parts broken away.

Figure 4 is a similar view showing the cylinder in operative position.

Figure 5 is a view of the device for preventing the cylinder from movement.

Figure 6 is a top plan view of Figure 5.

Figure 7 is a detail view showing an end elevation of the yoke like guide and its association with the cylinder.

Figure 8 is a detail view of the ring bearing for the cylinder.

Figure 9 is a detail view of the bevelled nut employed in this invention.

Figure 10 is a view of a modified form of the cap for the cylinder.

Our improvement may be attached to the motor of a tractor without altering any of the parts of the tractor, it being merely necessary to remove two of the bolts between the cylinder block and the crank case, and the bolt openings receive therethrough the bolt portions of elements constituting the improvement, the said elements maintaining as an effective connection as the bolts removed. Also the improvement is of such size that the same will not, in any way, render the tractor cumbersome.

Referring now to the drawings in detail, in which similar numerals of reference designate corresponding parts throughout the several views, the numeral 1 designates a tractor driven by an internal combustion motor 2. The numeral 3 designates a post which is electrically connected with the magneto 4, and electrically connected to the post 3 is a conductor 5 which is also electrically connected to the terminal post of the coils 6.

In the present instance, we remove from the post 3 the ordinary binding nut and substitute in lieu thereof a nut 7 that has its outer face from its upper end arranged at an outward inclination, as indicated by the numeral 8.

In attaching our improvement to the motor we remove the third bolt from between the cylinder block and the crank case, and through the openings for the bolt we pass the threaded shank of a ring bearing 9. On the shank of the ring bearing there are upper and lower nuts 10 and 11 respectively that contact with the upper and lower flanges of the block and casing.

Also we remove the fifth outer bolt from between the block and casing, and through the openings therefor we pass the threaded shank 13 on the end of a yoke-like guide 14. The guide 14 has its lower face flat and rests on the flange of the block, and the shank 13 has threaded thereon a nut 15 that contacts with the flange of the casing. The yoke 14 has its inner face straight, but its outer face is arranged at an outward angle from its top to its bottom as indicated, for distinction, by the numeral 16. Preferably, the top of the yoke is projected over the angle face 16 thereof, the said top indicated by the numeral 17, having a threaded opening therethrough, and in this opening there is screwed an adjusting bolt 18.

The numeral 19 indicates a cylinder which, in the present instance, preferably has both of its ends closed. The cylinder is of electric conductivity and is freely received in the ring bearing 9. The forward end of the cylinder, or the end opposite the nut 8 for the post 3 is closed by a cap nut 21 that has its outer face beveled, as at 22, and this beveled face is disposed opposite the beveled face 8 of the nut 7. If desired, the outer face of the cap nut may be provided with teats 22′, in the nature of contact elements, as disclosed by the full and dotted lines in Figure 10 of the drawings. The cap nut is also of electric conductivity.

The opposite end of the tube 19 is closed by a threaded member 23, the same having its head portion formed with a reduced longitudinally extending finger 24, and the finger has a transverse opening 25 therethrough through which is passed a key member 26. The key is designed to rest on the inclined face 16 of the yoke, and it should have been stated that the yoke as well as the ring bearing is of electric conducting material.

In the cylinder 19 there are arranged mobile agents, such as a plurality of steel spheres 27. These spheres are normally in contact with each other and with the member 23 that closes what I will term the outer end of the cylinder 19 and consequently the cylinder is maintained at an inclination, finding a fulcrum in the ring bearing 9. The key 26, contacting with the inclined wall 16 of the yoke 14 will exert a longitudinal or rectilinear movement on the cylinder 19, causing the contact end 22 thereof to be moved away from the contact nut 19 when the cylinder is in normal position and the contact end thereof is elevated above the contact nut 8. It will be apparent that a rearing or upward movement of the forward end of the tractor will cause the mobile agents 27 to gravitate toward the contact end of the said cylinder, thus overbalancing the cylinder and causing the contact end thereof to be swung downwardly. The swinging of this end of the cylinder brings the contact 22 in engagement with the contact nut 8, but the mobile agents also cause a rectilinear movement of the tube, bringing the same into tight engagement with the nut 7, and consequently breaking the electric circuit of the motor and stopping the motor.

The bolt 18, being in the path of engagement with the finger 24 regulates the swinging of the cylinder in the direction of the contact nut 7, and consequently, if desired, the said bolt may be so adjusted as to regulate the contact between the cylinder and nut. Also the number of spheres 27 employed may be regulated so that the time and degree of force of swinging and longitudinal movement of the cylinder may be likewise regulated.

There are times when the tractor is to travel over inclinations in which the breaking of the circuit is not desired, and to provide for this, we pivotally support in any suitable or desired manner on the body of the tractor, and in any convenient position with respect to the operator thereof, a lever 29 that has its outer end offset to provide a right angular extension 30 that is arranged directly below the cylinder 19. The lever 29 is influenced by a spring 32 to bring the finger 30 thereof out of contact with the cylinder, but it will be manifest that pressure upon the lever in a downward direction will cause the upward swinging of the fixed end 30 thereof which will contact with the cylinder and hold the same above and prevent the engagement thereof with the contact nut 8.

It will be apparent from the foregoing that notwithstanding the liability of the improvement not performing the functions stated, the same will not in any measure interfere with the normal working of the tractor inasmuch as the ignition will not be broken unless the forward portion of the tractor is raised to an undue extent, such as when the tractor tends to rear and swing over backwardly, and also we would have it understood that it is within our rights to make such slight changes from the construction described and illustrated as fall within the scope of what is claimed.

Having described the invention, I claim:—

1. In a tractor driven by an internal combustion engine, means on the tractor operable by the upward or rearing movement of the forward end of the tractor to automatically break the ignition of the engine, said means comprising a ring bearing adjustably secured to the cylinder block of the tractor engine, a hollow cylinder arranged through the ring bearing and being formed from non-insulating material, a cap nut closing one end of the hollow cylinder and being provided with a bevelled outer end, a yoke like guide rising from the engine in spaced relation to the ring bearing and being provided with an inclined wall, a headed member closing the opposite end of the cylinder, a finger extended from the headed member and being received for limited vertically adjustable movement in the yoke, a key member passing through the finger and arranged for slidably engaging the inclined wall of the yoke like guide, a nut having its outer face formed at its upper end outwardly inclined and being adapted to replace the binding nut on the post leading from the magneto of the tractor engine, said nut being arranged in the path of the cap nut of the cylinder, and having its bevelled outer end adapted for operative engagement therewith as and for the purpose specified.

2. In a tractor driven by an internal combustion engine, means on the tractor operated by the upward or rearing movement of the forward end of the tractor to automatically break the ignition of the engine, means for preventing the operation of said automatically ignition breaking means, and comprising a spring controlled rod, an offset end forming one terminal of said rod for engagement with the automatically ignition breaking means in its normal position, and means for moving said offset terminal out of engagement with said ignition breaking means.

In testimony whereof we affix our signatures.

OTIS CHAMBERLAIN.
ELLSWORTH D. HAYDEN.